United States Patent
Chandrashekhar et al.

(10) Patent No.: US 10,911,397 B2
(45) Date of Patent: Feb. 2, 2021

(54) AGENT FOR IMPLEMENTING LAYER 2 COMMUNICATION ON LAYER 3 UNDERLAY NETWORK

(71) Applicant: Nicira, Inc., Palo Alto, CA (US)

(72) Inventors: Ganesan Chandrashekhar, Campbell, CA (US); ChiHsiang Su, Santa Clara, CA (US); Minjal Agarwal, Santa Clara, CA (US); Xiaohu Wang, Cupertino, CA (US); Dileep Devireddy, San Jose, CA (US); Hitesh Patel, Newark, CA (US)

(73) Assignee: NICIRA, INC., Palo Alto, CA (US)

(*) Notice: Subject to any disclaimer, the term of this patent is extended or adjusted under 35 U.S.C. 154(b) by 244 days.

(21) Appl. No.: 15/955,399

(22) Filed: Apr. 17, 2018

(65) Prior Publication Data
US 2019/0036868 A1     Jan. 31, 2019

Related U.S. Application Data

(60) Provisional application No. 62/539,433, filed on Jul. 31, 2017.

(51) Int. Cl.
| | |
|---|---|
| H04L 29/12 | (2006.01) |
| H04L 12/755 | (2013.01) |
| H04L 12/713 | (2013.01) |
| H04L 12/721 | (2013.01) |
| H04L 12/715 | (2013.01) |
| G06F 9/455 | (2018.01) |

(52) U.S. Cl.
CPC ........ *H04L 61/103* (2013.01); *G06F 9/45558* (2013.01); *H04L 45/021* (2013.01); *H04L 45/586* (2013.01); *H04L 45/64* (2013.01); *H04L 45/66* (2013.01); *H04L 61/6013* (2013.01); *G06F 2009/45595* (2013.01); *H04L 61/2076* (2013.01); *H04L 61/2514* (2013.01); *H04L 61/6009* (2013.01); *H04L 61/6022* (2013.01)

(58) Field of Classification Search
None
See application file for complete search history.

(56) References Cited

U.S. PATENT DOCUMENTS

| | | | |
|---|---|---|---|
| 9,419,897 B2 * | 8/2016 | Cherian | H04L 45/745 |
| 2017/0289033 A1 * | 10/2017 | Singh | H04L 61/103 |
| 2019/0034226 A1 * | 1/2019 | Gao | H04L 61/6009 |

* cited by examiner

*Primary Examiner* — Angela Nguyen
(74) *Attorney, Agent, or Firm* — Adeli LLP

(57) ABSTRACT

Techniques are disclosed herein for providing an agent for implementing layer 2 (L2) communication on a layer 3 (L3) underlay network. In one embodiment, an agent in virtualization software determines a newly available network address of a VM, configures a network interface of the L3 network to be associated with the network address such that network traffic for the network address is directed to the network interface, adds a route to a virtual router in the virtualization software indicating the VM is local, and adds a router to an address resolution table to associate the network address with a MAC address. This permits a packet sent from one VM to another VM to be processed by the virtual router based on routes therein and forwarded to the other VM either internally or using the L3 underlay network.

20 Claims, 6 Drawing Sheets

AGENT FOR IMPLEMENTING LAYER 2 COMMUNICATION ON LAYER 3 UNDERLAY NETWORK

BACKGROUND

Software defined networks (SDNs) typically comprise host computers in communication over a physical network infrastructure. Each host computer may include one or more virtualized endpoints such as virtual machines (VMs) or namespace containers (e.g., Docker® containers) that are connected to one another over logical network(s), such as logical overlay network(s), that are decoupled from the underlying physical network infrastructure. One common characteristic of software defined networking is a separation of the control plane from the data plane. Control planes may be concerned with determining the logical overlay network topology and maintaining information about network entities such as logical switches, logical routers, and virtualized endpoints, etc. The logical topology information is translated by the control plane into network configuration data, such as forwarding table entries to populate forwarding tables at virtual switches in each host computer. A virtual switch provided by a host computer may connect virtualized endpoints running on the same host computer to each other as well as to virtual endpoints on other host computers.

Virtualization software (also referred to herein as hypervisors) and the VMs and other virtual network entities implemented by such hypervisors may need to be instantiated on a cloud-based computing service such as Amazon Web Services, Microsoft Azure, or the like. Such clouds typically support layer 3 (L3) routing based on network addresses (e.g., Internet Protocol (IP) addresses). However, the VMs and virtual network entities may be designed based on an assumption of layer 2 (L2) switching based on data link layer addresses (e.g., Media Access Control (MAC) addresses) that is common in non-cloud based datacenters.

One approach for providing an L2 network to the VMs and virtual network entities is to connect them over a logical overlay network implemented on top of the underlying L3 routing based network. Such a logical overlay network may be implemented by hypervisor module(s) of a host computer that encapsulates packets exiting the host computer sent by a VM on the host computer and decapsulates packets entering the hypervisor module destined for a VM on the host computer. For example, Virtual Extensible Local Area Network (VXLAN) tunnel endpoint (VTEP) services for encapsulating packets (e.g., Geneve packet, VXLAN packet, etc.) may be implemented at each host computer or at a gateway. Such gateway (e.g. edge) or hypervisor-based VTEPs are generally connected to virtual switches implemented by the hypervisor for VMs on the same physical host. Hardware VTEPs are often integrated into top-of-rack (TOR) switches, but could be provided as stand-alone appliances for bridging logical overlay networks with physical networks.

While the term "VTEP" refers to "VXLAN" tunneling protocol, it is now often used regardless of the tunneling protocol. The hypervisor, in determining whether to encapsulate packets and the targets of the encapsulated packets based on the destination address of the original packet's header, may refer to internally-maintained forwarding tables that are populated by a control plane. For example, the VMs in the logical overlay network may not be directly addressable in the underlying L3 routing based network, but the VTEP endpoints may be directly addressable based on IP addresses of the VTEP endpoints and allow communication between the VMs in the logical overlay network.

For example, in some embodiments a source VM generates a packet with the MAC address of the source virtual machine set as a source address and the MAC address of the destination VM on a different host computer set as a destination address. The source VM then sends the packet to a virtual switch implemented on the same physical host as the source VM. The virtual switch, in accordance with forwarding tables associated with the virtual switch, forwards the packet to a VTEP which encapsulates the packet to generate an encapsulated packet. In such a case, the original packet may be referred to as an inner packet, and the encapsulated packet may be referred to as an outer packet. Further, a header of the inner packet including the MAC address of the source VM set as the source address and the MAC address of the destination VM set as the destination address may be referred to as an inner header. The VTEP performing the encapsulation, which is the source VTEP, in some embodiments further includes an outer header as part of the outer packet. In some embodiments, the outer header includes a source Internet Protocol (IP) address of the source VTEP generating and transmitting the encapsulated packet, and further includes a destination IP address of a destination VTEP that is associated with the destination VM. Accordingly, in the overlay network, the outer header is used to forward the encapsulated packet through the overlay network from the source VTEP to the destination VTEP. The destination VTEP may then extract the inner packet and forward the original (inner) packet to a virtual switch connected to the destination VTEP, which in turn forwards the original packet to the destination VM based on the inner header of the decapsulated original packet. In this example, the outer header includes L3 addresses for L3 routing, while the inner header used by the VMs still utilizes L2 addresses. The L3 addresses used in communications between VTEPs allows an overlay network that already uses VTEPs to utilize an L3 underlay network such as that provided by cloud-based computing service such as Amazon Web Services, Microsoft Azure, or the like without significant modification.

Some VMs may be configured to manage a logical overlay network such as described above. Typically, even though such management VMs may also be designed for L2 switching and require L2 adjacency, among other things, they are not themselves part of the overlay network because of the challenge of establishing a network that includes the VMs used to establish the network (a chicken-and-egg problem). Such management VMs have, in the past, used features of the L2 underlay such as VLANs to communicate and establish the logical overlay network. However, cloud-based computing services that do not provide the L2 infrastructure present new challenges for management VMs. Accordingly, techniques are needed for routing traffic for VMs and other virtual network entities designed for L2 switching on networks that use L3 routing without relying on an overlay network implemented by VTEP endpoints.

BRIEF SUMMARY

For a virtualized network executing on a layer 3 underlay network, some embodiments provide a method for an agent in a host computer to implement communication using layer 2 connectivity over the underlying layer 3 network. In some embodiments, the method receives, at an agent in a host computer, information about a network address that was not previously accessible on the host computer and that is associated with a virtual endpoint running in the host computer. The method further (1) associates the network address of the virtual endpoint with a network interface of an underlying network such that network traffic for the network address is directed to the network interface, (2) adds a route for the virtual endpoint to a routing table of a virtual router in the host computer, and (3) adds an address resolution entry for resolving the network address of the virtual endpoint into a media access control (MAC address) of the virtual endpoint to an address resolution table of an address resolution proxy in the host computer.

The virtual endpoint in some embodiments is a management VM (e.g., a VM associated with managing VM migration, VM provisioning, a virtual storage area network (vSAN), etc.) configured to manage at least part of an overlay network. In some embodiments, the method is implemented to associate a network interface with a public network address used in a network address translation operation performed by gateway VMs serving as gateways for logical networks. The network address in some embodiments is a property of the virtual endpoint, a virtual network interface card (VNIC) associated with the virtual endpoint, or a virtual port to which the virtual endpoint is connected. The virtual endpoint associated with the network address is configured to direct network traffic to the virtual router (e.g., as a default router) that has been programmed with the routing entry for the network address. After being configured by the agent, the virtual router in some embodiments forwards traffic from other virtual endpoints to at least one of a destination endpoint running in the host computer and a default router based on routes in the routing table of the virtual router.

In some embodiments, the underlying network is a layer 3 (L3) network and the network interfaces of the underlay network are associated with multiple network addresses. Associating the network address of the virtual endpoint with the network interface includes, in some embodiments, invoking one or more application programming interfaces (APIs).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Embodiments of systems and methods described herein provide techniques for routing network traffic on a layer 3 (L3) network to virtual machines (VMs) based on Internet Protocol (IP) addresses of those VMs without using a layer 2 (L2) overlay network (e.g., as implemented by VTEP endpoints). As used in this document, the term data packet, packet, or message refers to a collection of bits in a particular format sent across a network. It should be understood that the term data packet, packet, or message may be used herein to refer to various formatted collections of bits that may be sent across a network, such as Ethernet frames, IP packets, TCP segments, UDP datagrams, etc. While the examples below refer to data packets, packets, or messages, it should be understood that the invention should not be limited to any specific format or type of data message. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

As used herein, L2 generally refers to a data link layer (e.g., media access control (MAC) or Ethernet layer) and L3 to a network layer (e.g., IP layer) OSI model, although the concepts described herein and referred to simply as "L2" or "MAC" and "L3" or "IP" may be applicable to corresponding layers in other networking models. The routing of packets on the L3 network without using an L2 overlay network allows the management VMs described above (and other entities) that cannot be part of such an overlay network but are designed for L2 packet forwarding to communicate, migrate, fail over, etc. without relying on an overlay network. Example embodiments may be described herein with respect to VMs as endpoints, but it should be understood that techniques disclosed herein may also be employed with other virtualized endpoints such as namespace containers.

Figure 1:
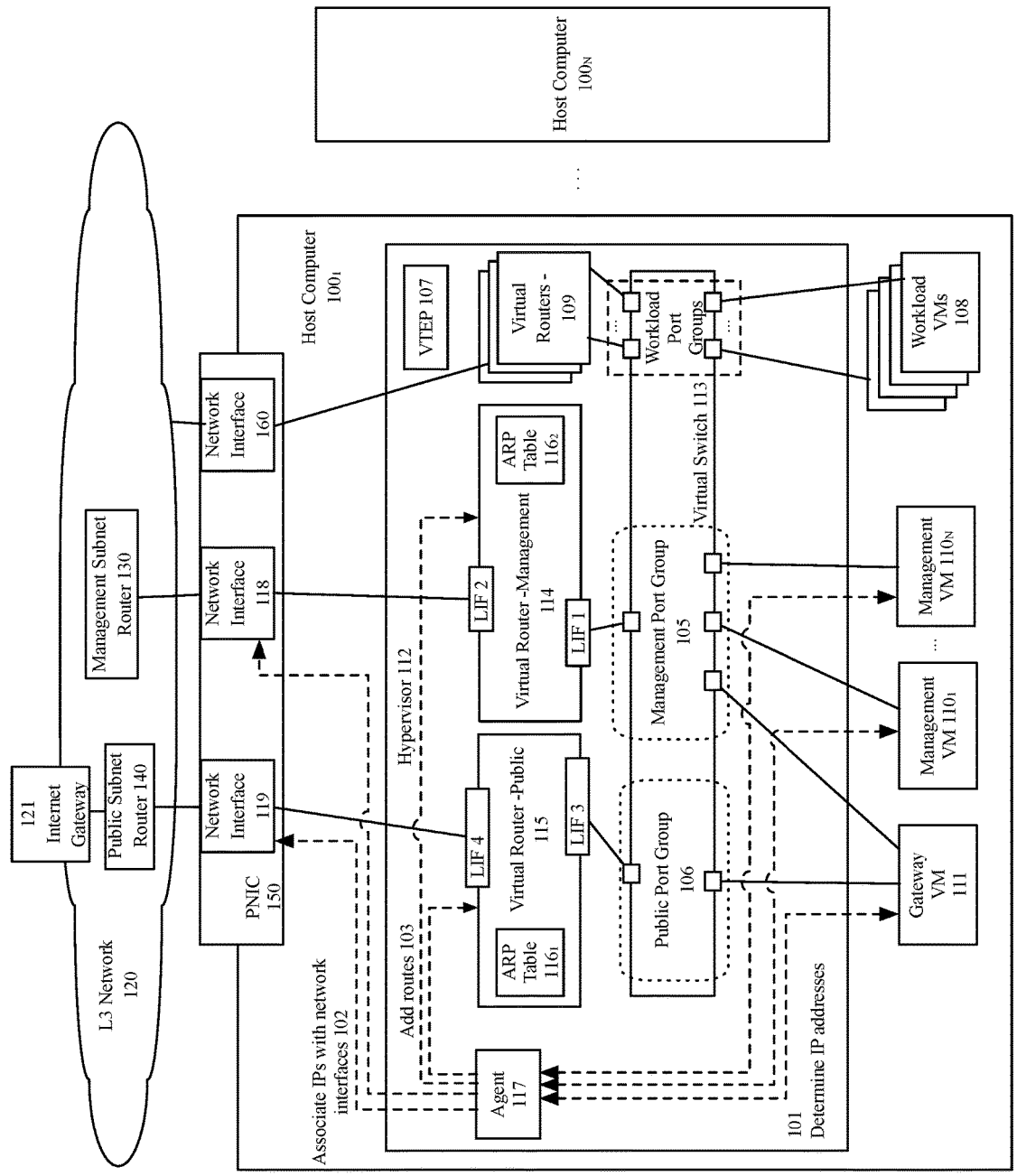
FIG. 1 is a block diagram of a system in which an embodiment may be implemented.

FIG. 1 is a block diagram of a system in which an embodiment may be implemented. As shown, the system includes multiple host computers $100_{1-N}$ and an underlying L3 network 120. L3 network 120 in some embodiments represents a physical and/or virtual network, such as a private cloud network, that relies on switching and routing techniques. For example, host computers $100_{1-N}$ in some embodiments are servers or computing instances on a private cloud network. Only one host computer $100_1$ is illustrated in detail for conciseness, but it should be understood that other host computers include similar components. In one embodiment, each of host computers $100_{1-N}$ is constructed on a server class hardware platform such as an x86 architecture platform that includes a processor, system memory, and disk drive, among other things.

As shown, host computer $100_1$ includes a hypervisor 112 running on host computer $100_1$'s hardware (not shown). Hypervisor 112 is virtualization software that performs system resource management and virtual machine (VM) resource emulation. VM resource emulation may be performed by a virtual machine monitor (VMM) component (not shown). In some implementations, each VM has a corresponding VMM instance. Depending on implementation, hypervisor 112 may be hosted or unhosted. Unhosted hypervisors generally rely on a specialized virtualization kernel for managing system resources, whereas hosted hypervisors rely on commodity operating systems—the "hosting operating system"—such as Windows, Mac OS X, or Linux to manage system resources.

As shown, the VMs running in host computer $100_1$ include workload VMs 108, management VMs $110_{1-N}$, and a gateway VM 111. It should be understood that other VMs that are not shown also run in host computer $110_1$ in some embodiments. Management VMs $110_{1-N}$ include VMs that manage a logical overlay network, over which other VMs (e.g., workload VMs 108) communicate, with the logical overlay network providing L2 switching over the underlying L3 routing-based network 120. Such a logical overlay network may be implemented by, e.g., encapsulating egress packets from the virtual machines and decapsulating ingress packets, as described above. Such encapsulation in some embodiments is done by VTEP 107 for workload VMs 108 that use port groups (e.g., one of a set of workload port groups) of virtual switch 113 and virtual routers 109 to communicate over the overlay networks.

In some embodiments, management VMs $110_{1-N}$ may include a virtual machine management server that controls provisioning of VMs, powering of VMs on and off, and resource management of VMs in host computers, among other things. One example of a VM management server may be vCenter®, a product commercially available from VMware, Inc. of Palo Alto, Calif. Other management VMs may include a management plane of a virtual network, such as the NSX Manager product that is also commercially available from VMware, Inc. Gateway VM 111 is a VM that provides a gateway service permitting other VMs access to an external network, including, e.g., the Internet (e.g., via internet gateway 121 of L3 network 120) or a VPN. Services such as network address translation (NAT), firewall, load balancing, virtual private networks (VPNs), and the like may also be enabled on gateway VM 111, as appropriate.

Each of management VMs $110_{1-N}$ and gateway VM 111 includes at least one virtual network interface card (not shown) which are responsible for exchanging packets between that VM and hypervisor 112. Such virtual network interface cards (VNICs) may be software abstractions of physical NICs (PNICs), and each VM $110_{1-N}$ and 111 may be connected to a virtual port provided by a virtual switch 113 via its VNIC. Further, each host computer $100_{1-N}$ may include one or more PNICs (not shown) for communicating with the underlying L3 network 120.

Illustratively, hypervisor 112 includes virtual switch 113, a management virtual router 114, a public virtual router 115, and address resolution protocol (ARP) tables 116. As shown, ARP tables 116 exist in virtual routers 114 and 115, however in some embodiments, ARP tables 116 exist in a separate ARP proxy module that provides address resolution services to VMs on host computer $100_1$. In some embodiments, virtual switch 113, virtual routers 114 and 115, and agent 117, as well as physical device drivers, may execute in privileged virtual machine(s), which are often referred to variously as a "Domain zero," "root-partition," or "parent-partition." Virtual routers 114 and 115, and virtual switch 113 in some embodiments are implemented in a single module implementing both switching and routing functionality like traditional physical routers. In some embodiments, virtual switches and routers implement distributed virtual (logical) switches and/or distributed virtual (logical) routers (collectively virtual (logical) forwarding elements) along with different host computers. Distributed virtual switches and/or distributed virtual routers in some embodiments are implemented as a single logical switch or logical router, respectively, across the different host computers. In some embodiments, a distributed virtual (logical) forwarding element performs the logical packet processing (i.e., processing for the logical network including the virtual (logical) forwarding elements) at a first hop virtual switch and/or virtual router.

In one embodiment, management virtual router 114 includes a logical interface coupled to a management VM port group 105 (e.g., a group of ports of the virtual switch that are in a same subnet). Public virtual router 115 in some embodiments includes a logical interface coupled to an gateway uplink port group 106 that serves the outer subnet for, e.g., cloud provider and tenant logical routers. Illustratively, management VMs $110_{1-N}$ are connected to virtual ports on virtual switch 113 belonging to a management port group 105, while gateway VM 111 is connected to virtual ports on virtual switch 113 belonging to both management port group 105 and public port group 106. As shown, management virtual router 114 includes one logical interface (shown as LIF 1) which is a downlink interface connected to management port group 105 and another logical interface (shown as LIF 2) which is an uplink interface connected to a network interface 118, while public virtual router 115 also includes an LIF downlink interface (shown as LIF3) connected to public port group 106 and an LIF uplink interface (shown as LIF4) connected to a network interface 119. Each virtual router 114 and 115 may further have a physical MAC address and uplink LIF IP address/VLAN matching the network interface 118 and 119 it is connected to, respectively. Port groups are generally L2 constructs that aggregate multiple ports under a common configuration (e.g., in a same subnet), with the port groups providing templates for creating virtual ports with sets of specifications particular to the port groups and further providing anchor points for virtual machines to connect to networks. It should be understood that in, e.g., distributed virtual switches, virtual ports implemented by hypervisors running in different host machines may be part of the same port group. In some embodiments, virtual local area networks (VLANs) are enabled on port groups. Additionally, an association between a particular port in a port group and a particular VLAN identifier in some embodiments overrides an association between the port group and another VLAN.

It should be understood that VMs, such as management VMs $110_{1-N}$ and gateway VM 111, that are connected to the same port group or on the same VLAN are able to communicate with each other, and the ports of the same port group are also typically L2 adjacent to each other. However, this L2 level of abstraction, including the notions of port groups, L2 adjacency, etc., may not be supported by the underlying L3 network 120. For example, L3 network 120 may only see an IP address of hypervisor 112 and not be aware of VMs $110_{1-N}$ or 111. This is in contrast to implementing port groups on L2 networks where underlay ports of physical switch(es) that back the port group may be configured to be in the same L2 network (e.g., a same VLAN). It is assumed herein that such configuring of underlay ports to be in the same L2 network is not possible for L3 network 120.

Network interfaces 118, 119, and 160 are virtual network interface constructs provided by L3 network 120 to attached computing instances to communicate over the L3 network 120. In some embodiments, network interfaces 118, 119, and 160 appear to virtual switch 113/virtual routers 109, 114, and 115 as, e.g., an uplink port group in the same way a physical NIC would. In certain aspects, network interfaces 118, 119, and 160 correspond to or are associated with one or more PNICs of host computer $100_1$ (e.g., PNIC 150) to exchange packets between host computer $100_1$ and L3 network 120 via network interfaces 118, 119, and 160. Further, each of network interfaces 118, 119, and 160 in some embodiments is associated with one or more IP addresses. Accordingly, packets sent in the L3 network 120 to any of the one or more IP addresses of network interfaces 118, 119, and 160 are sent to the one or more PNICs of host computer $100_1$ as further described herein. It should be understood, accordingly, that VMs whose IP addresses are associated with a network interface are directly addressable, which is not the case with the encapsulation techniques employed in overlay networks.

In some embodiments, network interfaces 118, 119, and 160 are logical interfaces implemented by a PNIC (e.g., PNIC 150). A PNIC implementing the network interfaces in some embodiments translates the semantics (e.g., VLAN ID) of a logical interface (e.g., LIF 2) into the semantics of the network interface (e.g., network interface 118) for communication over the provider network (e.g., network 120). In some embodiments, the network interfaces 118, 119, and 160 are implemented in conjunction with a provider network such that some portions of the network interface are implemented on the PNIC of a host computer while other aspects are implemented on the provider network. In a particular embodiment, L3 network 120 is an Amazon Web Services (AWS) private cloud network, and the IP address of a management VM is added by agent 117 as a secondary IP address (with an IP address of the virtual router being the primary IP address) to an elastic network interface (ENI), which is a network interface of the AWS network, by invoking application programming interfaces (APIs) provided by AWS.

Agent 117 assists in implementing an L2 abstraction for L3 underlay network 120 such that the notions of port groups, L2 adjacency, etc. are provided using existing packet forwarding mechanisms of the L3 network and without relying on an L2 overlay network. In one embodiment, agent 117 is a daemon running on hypervisor 112. As shown, agent 117 is responsible for determining an IP address assigned to one of management VMs 110 and/or gateway VM 111 at 101 and configuring at least one of network interfaces 118 and 119 of L3 network 120 to be associated with the determined IP address at 102. By associating the IP address of one of VMs 110 and/or gateway VM 111 with at least one of network interfaces 118 and 119, the particular VM 110 and/or gateway VM 111 is directly accessible via its IP address in the L3 network 120. One of ordinary skill in the art would appreciate that similar functions could be provided in other provider L3 networks.

Further, in some embodiments, agent 117 is responsible for adding (at 103) a route to the routing table (not shown) and address resolution information to ARP table 116 of virtual router 114 for VM 110. For example, the route indicates that a packet with a destination IP address of the VM 110 (e.g., 10.0.224.12/32) should be sent over a downlink interface LIF1 of virtual router 114 to local virtual switch 113. Virtual router 114 in some embodiments is further configured with additional routes (e.g., default routes) and a separate ARP table 116 (e.g., as configured by a central control server or a control server cluster (not shown) in communication with host computer $100_1$) for determining next-hop MAC addresses based on the destination IP address. The ARP table in some embodiments is also populated by agent 117 for management VMs not in the overlay network. As used herein, a route is a rule that can be used to determine where packets should be directed based on a destination IP address of the packet.

For example, a management VM 110 sends a packet with a destination IP address of a destination, but does not have a destination MAC address. Accordingly, management VM 110 generates an ARP query for the next-hop MAC address corresponding to the destination IP address and transmit the ARP query over the virtual port of the virtual switch 113 to which the VM 110 is connected. In some embodiments, the IP addresses of the management VMs are in a /32 subnet and all ARP requests are sent to virtual router 114 as the default gateway for the management port group 105 of virtual switch 113. Virtual router 114 in some embodiments acts as an ARP proxy using ARP table $116_2$ to resolve the destination IP address. For other management VMs acting on the host computer $100_1$, the ARP table has entries programmed by agent 117 to resolve the MAC address. For other IP addresses, the ARP table stores learned addresses and if an IP address is not included in the ARP table, virtual router 114 sends an ARP request and upon receiving an ARP reply creates an entry to resolve future requests for the destination IP address.

As described above, in some embodiments the network configurations of VMs $110_{1-N}$ and 111 themselves are configured so that packets are sent to the appropriate virtual router(s). For example, in some embodiments VM 110 is configured as part of a /32 subnet, meaning any destination IP address other than the IP address of VM 110 is not in the same subnet as VM 110. Therefore, VM 110 includes as the next hop MAC address for all packets the MAC address of a default gateway, which is set as virtual router 114.

In some embodiments, virtual router 114 routes traffic between, e.g., management VMs 110 executing on the same host computer using the /32 routes programmed by agent 117. For example, a source VM executing on the host computer generates a packet with a destination IP address of a destination VM executing on the host computer which is sent to virtual router 114 as discussed. Virtual router 114 determines based on its routing table that the packet should be sent over downlink LIF1 to management port group 105 on virtual switch 113. Accordingly, virtual router 114 changes the destination MAC address of the packet to that of the destination VM. Virtual router 114 then sends the packet over downlink LIF1 to virtual switch 113, which sends it to the destination VM based on the destination MAC address in the packet.

In some embodiments, virtual router 114 is configured to send traffic between a VM executing on the same computer as virtual router 114 and a destination VM belonging to the same port group executing on a different host computer to a default gateway for the port group (shown as management subnet router 130) on the L3 network 120. For example, virtual router 114 includes a route that indicates packets received with a destination IP address corresponding to one of the IP addresses of VMs in the port group but not local (e.g., 10.0.224.0/19) should be sent on an uplink interface LIF2 of virtual router 114 to the management subnet router 130. Accordingly, virtual router 114 changes a next hop MAC address of the packet to that of management subnet router 130 and send the packet over uplink interface LIF2 and accordingly network interface 118. Network interface 118 is configured by the L3 network 120 to send the packet to management subnet router 130. Management subnet router 130 is configured to route the packet to the appropriate network interface 118 associated with virtual router 114 on the destination host computer 1002 based on the destination IP address of the packet. For example, ins some embodiments management subnet router 130 includes a routing table with routes for IP addresses to network interfaces. Accordingly, management subnet router 130 changes a destination MAC address of the packet to that of network interface 118 on the destination host computer 1002 (or of the next hop in the network to reach network interface 118). At host computer 1002 the packet is forwarded from network interface 118 of host computer 1002 to virtual router 114 on host computer 1002 associated with the destination IP address. Virtual router 114 processes the packet and delivers it to the destination VM through LIF 1 connected to the management port group on virtual switch 113 of host computer 1002.

For traffic sent from a source VM 110 to a destination VM in a different port group than the source VM 110, virtual router 114 in some embodiments is configured to send the packet to a default gateway (e.g., gateway VM) (e.g., implemented on the same or another host machine). For example, the virtual router includes a route that indicates packets received with any other IP address (e.g., 0/0) should be sent to the default gateway and routed by the default gateway.

The process described above of configuring a network interface and adding a route to a virtual router is particularly important in the case of VM migration, where a VM (e.g., one of management VMs $110_{1\text{-}N}$) that moves from a source host computer to a destination host computer would no longer be reachable without associating the VM's IP address with a network interface that is also associated with the destination hypervisor (and, in particular, connected to the virtual router in the destination hypervisor) on the destination host computer on which the migrated VM runs. It should be understood that an L2 underlay may be able to handle such VM migrations by migrating the VM's MAC address, but it is assumed herein that L3 underlay network 120 is unable to do so. As a result, an agent on the source host computer and/or the destination host computer is needed to migrate the VM's IP address. For example, an agent on the source host computer or the destination host computer causes the removal of an association of the IP address of the VM 110 from a network interface (e.g., network interface 118) connected to the virtual router in the source hypervisor on the source host computer 100. Further, an agent on the destination host computer causes an addition of an association of the same IP address of the VM 110 with a network interface connected to the virtual router in the destination hypervisor of the destination host computer. Doing so permits the migrated VM to be reachable via its IP address, as packets sent to the IP address can be routed by L3 network 120 to the associated network interface and forwarded to the virtual router in the destination hypervisor, from which the packets can then be forwarded to the migrated VM. Here, it is assumed that the underlying L3 network 120 includes mechanisms for, e.g., physical and/or virtual routers to learn the appropriate routes necessary to route packets across L3 network 120 to a destination IP address which is associated with a network interface. That is, when VM IP addresses are associated with network interfaces of L3 network 120, the routing tables of physical and/or virtual devices in the underlying L3 network 120 are updated to permit the devices to correctly route packets destined to those IP addresses.

In addition to associating the VM's IP address with an appropriate network interface of L3 network 120, the agent on the destination host computer is further configured to add a route to a routing table of a virtual router for a VM on host computer. For example, the agent on the destination host computer adds a route to the routing table of the virtual router on the destination host computer for a management VM that has migrated to the destination host computer. Further, in some embodiments the agent on the source host computer removes a similar route from the routing table of the virtual router on the source host computer.

Figure 2:
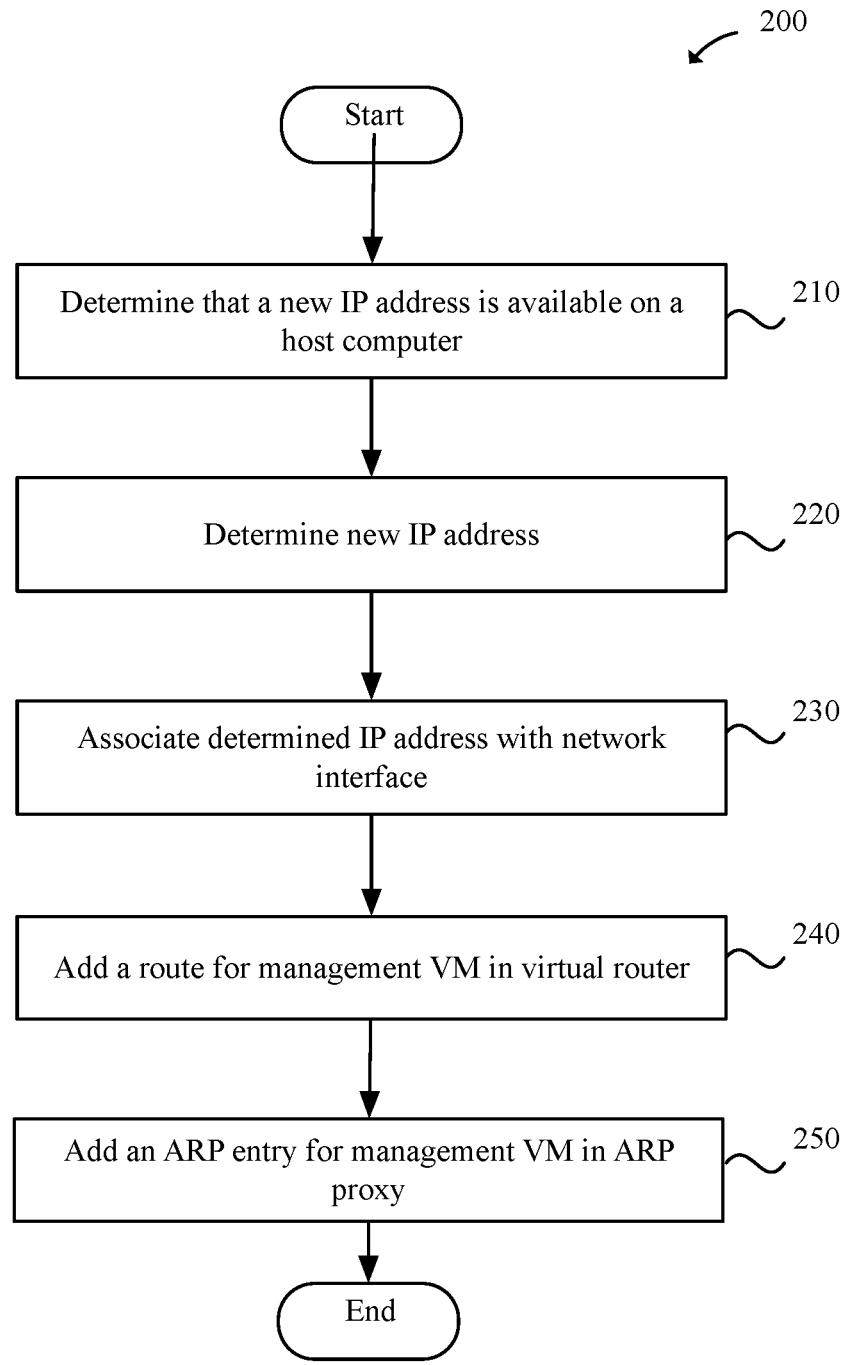
FIG. 2 conceptually illustrates a process of tracking and plumbing virtual machine (VM) Internet Protocol (IP) addresses, according to an embodiment.

FIG. 2 illustrates a process 200 for tracking and plumbing virtual machine IP addresses, according to an embodiment. In some embodiments, process 200 is carried out by an agent such as agent 117. As shown, process 200 begins at step 210, when the process determining that a new IP address is available on the host computer. A new IP address is available on the host computer when, for example, a VM has been provisioned on the host computer or has been migrated to the host computer or when a new public IP address for a NAT operation is configured on a gateway VM of the host computer. For example, the provisioned or migrated VM in some embodiments is a management VM such as VMs $110_{1\text{-}N}$ or a gateway VM 111. In some embodiments, the determination is based on information received from the application or program responsible for provisioning or migrating the VM. In some embodiments, a vmkernel callout module provides notification of IP movement during a vMotion or failover operation. A virtual machine communication interface (VMCI) provides information about new NAT rules (e.g., the public IP address) relevant to a gateway VM (e.g., gateway VM 111) in some embodiments. For example, the provisioned or migrated VM in some embodiments is a management VM such as VMs $110_{1\text{-}N}$ or a gateway VM 111.

At step 220, the process determines the new IP address, e.g., the IP address assigned to the VM that has been provisioned or migrated or the new public IP address for the NAT operation. In some embodiments, the agent or another component listens on certain events and determine the IP address responsive to those events. The events in some embodiments include VNICs being created, deleted, or migrated in a port group, and a gateway VM sending an IP address event such as creating or receiving a new NAT rule. In some embodiments, an agent such as agent 117 receives information about the events from the module responsible for migrating a VM (e.g., a vMotion VM or application) or enforcing the new NAT rule (e.g., the gateway VM 111). The IP address itself in some embodiments is set as a property of, e.g., the VM itself, the VNIC, or a virtual port and read from the configure file of the VM, VNIC, or virtual port. Alternatively, an API is implemented that permits IP addresses of VMs to be queried.

At step 230, the process associates the determined IP address with a network interface (e.g., network interface 118 (and/or network interface 119 in the case of gateway VM)) by, e.g., invoking an API provided by the underlying L3 network 120. The particulars of this step for migrating VMs are described in greater detail below with respect to FIG. 3.

At step 240, the process adds a route for the VM in a virtual router. In the case of VM migration, a similar agent in the source host computer further causes a similar route to be removed in the virtual router of the source host computer from which the VM migrated (e.g., the routing table of the virtual router in the source host computer is updated by a hypervisor agent in the source host computer to remove such a route). As a result of such route additions, packets that are destined for local VMs are forwarded by a virtual router such as virtual router 114 to those VMs, while packets destined for VMs that are not local to the host computer are sent over a network interface (e.g., network interface 118) of L3 network 120 and via the L3 network 120 (e.g., virtual or physical routers inside L3 network 120) to the appropriate host computer or gateway, based on the association of the non-local VM's IP address to a network interface of L3 network 120, and ultimately to the non-local VM. As described, gateways such as gateway VM 111 generally permit VMs running in host computer 100₁ to access the outside world by transmitting packets through the gateways, which are virtual routers in some embodiments. Gateways in some embodiments also provide gateway services such as Dynamic Host Configuration Protocol (DHCP), VPN, NAT, dynamic routing, firewall, and load balancing.

As an example, after routes are added by agent 117 to virtual router 114, virtual router 114's routing table may look as follows for the AWS case:
  /32 entries→LIF 1 pertaining to local VMs answering that IP.
  10.0.224.0/19→default router reachable on LIF 2. Common on all hosts.
  0/0, either of:
  0/0→default router (e.g., provider logical router (PLR)) on hosts not hosting a default gateway (e.g., gateway VM 111); or
  0/0→IP of default gateway on hypervisor where default gateway is present.

This routing table includes particular /32 entries for local VMs with particular/32 IP addresses and virtual router 114 modifies packets with such IP addresses as their destinations to include the appropriate next-hop MAC addresses so that the packets can be forwarded to the local VMs. In some embodiments, the association between the IP address and the next-hop MAC address is maintained in an ARP table (e.g., ARP table 116). For packets destined for IP addresses of other VMs on the 10.0.224.0/19 subnet that are not local according to this routing table virtual router 114 modifies the next-hop MAC address to a MAC address of, e.g., a default router reachable via logical interface 2 of virtual router 114. In addition, the routing table includes 0/0 routes used to, e.g., forward packets to a public network.

Similarly, the routing configuration for virtual router 115 includes the following entries:
  /32 entries→LIF 3 pertaining to all the Gateway VM VNICs' primary IP addresses on the host
  /32 entries→LIF 3 pertaining to all the Gateway VM VNICs' secondary IP addresses on the host
  /32 entries→LIF 3 pertaining to all the Gateway VM VNICs' public IP addresses on the host
  0/0→default router (which is the internet gateway in this case)

Similar to the discussion above, this routing table includes /32 entries indicating how to route /32 IP addresses as well as 0/0 routes for routing packets to, e.g., public networks. In this example, it should be understood that, in addition to adding the foregoing routes to the routing tables of virtual routers 114 and 115, agent 117 further associates the /32 IP addresses of local VMs with the network interfaces of the host computer hosting the VMs (e.g., as secondary IP addresses in the AWS case).

After associating the VM's IP address with the network interface and adding a routing table entry to the virtual router, packets directed to the VM's IP address from other host computers are directed, e.g., by L3 underlay network 120, to the network interface associated with the VM's IP address which forwards the packet to the virtual router. The virtual router, finding an entry for the VM's IP address then forwards the packet to the VM.

At step 250, the process continues by programming an ARP proxy with an entry for the IP address and a MAC address associated with the IP address. In some embodiments, the ARP proxy is a virtual router (e.g., virtual router 114) that maintains an ARP table (e.g., ARP table 116). In some embodiments, an agent that performs process 200 retrieves both IP and MAC addresses for the newly provisioned or migrated management VM from a kernel on the host machine that is aware of the VMs executing on the host machine. The ARP proxy uses the programmed ARP entries to resolve ARP requests without requiring further ARP requests.

Figure 3:
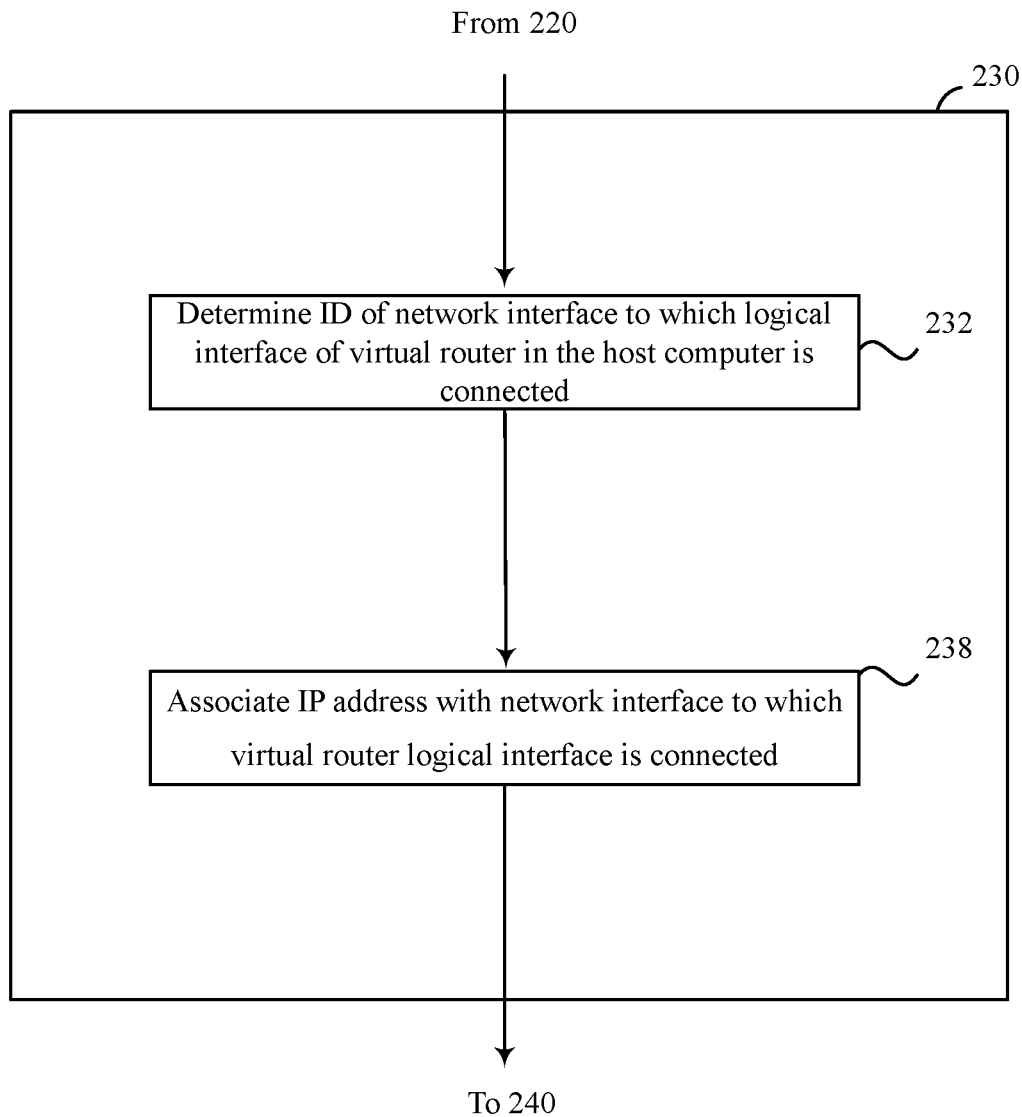
FIG. 3 conceptually illustrates in greater detail a step of associating a VM IP address with a network interface subsequent to VM migration, according to an embodiment.

FIG. 3 illustrates in greater detail an embodiment of the process of associating a VM's IP address with a network interface described in step 230 of FIG. 2, e.g., subsequent to a VM migration. As for FIG. 2, in some embodiments the process of FIG. 3 is performed by an agent such as agent 117. As shown, at step 232, the process determines an identifier (ID) of a network interface to which the logical interface of the virtual router (e.g., virtual router 114) in the host computer is connected. In one embodiment, the process determines the ID of the network interface at step 232 by invoking one or more APIs provided by the provider of the underlying L3 network 120. For example, AWS provides API(s) that can be called to determine the ID of the network interface, among other things. Similarly, step 238, described below, in some embodiments includes invoking such API(s).

At step 238, the process associates the IP address with the network interface to which the virtual router's logical interface in the destination hypervisor is connected. By associating the IP address of the VM with the network interface, traffic sent over the underlay network 120 destined for the VM is directed to the network interface and the virtual router for routing to the VM. Continuing the example of AWS, AWS API(s) are invoked to add the IP address as a secondary IP address of the network interface to which the logical interface of the virtual router is connected.

In a parallel operation, an agent on the source computer from which the VM was migrated performs similar functions to remove an association between the VM's IP and the network interface when it receives information indicating that the VM no longer executes on the source computer. In some embodiments, an agent on the source computer queries for an ID of the network interface to which the IP address assigned to the VM is currently associated. It should be understood that in some embodiments this network interface is connected to a virtual router in a source host computer from which the VM migrated. Continuing the example of AWS, the IP address of the management VM, in some embodiments, was previously added as a secondary IP address (with an IP address of the virtual router being the primary IP address) to an ENI of the AWS network by invoking API(s) provided by AWS.

The agent on the source computer removes the IP address from the network interface to which the IP address is currently associated. In some embodiments, the agent invokes APIs provided by the underlay network provider. As described, the IP address in some embodiments is a secondary IP address (with the virtual router's IP address being the primary IP address) of an ENI in an AWS network, and such secondary IP addresses are removed by invoking AWS APIs.

Figure 4:
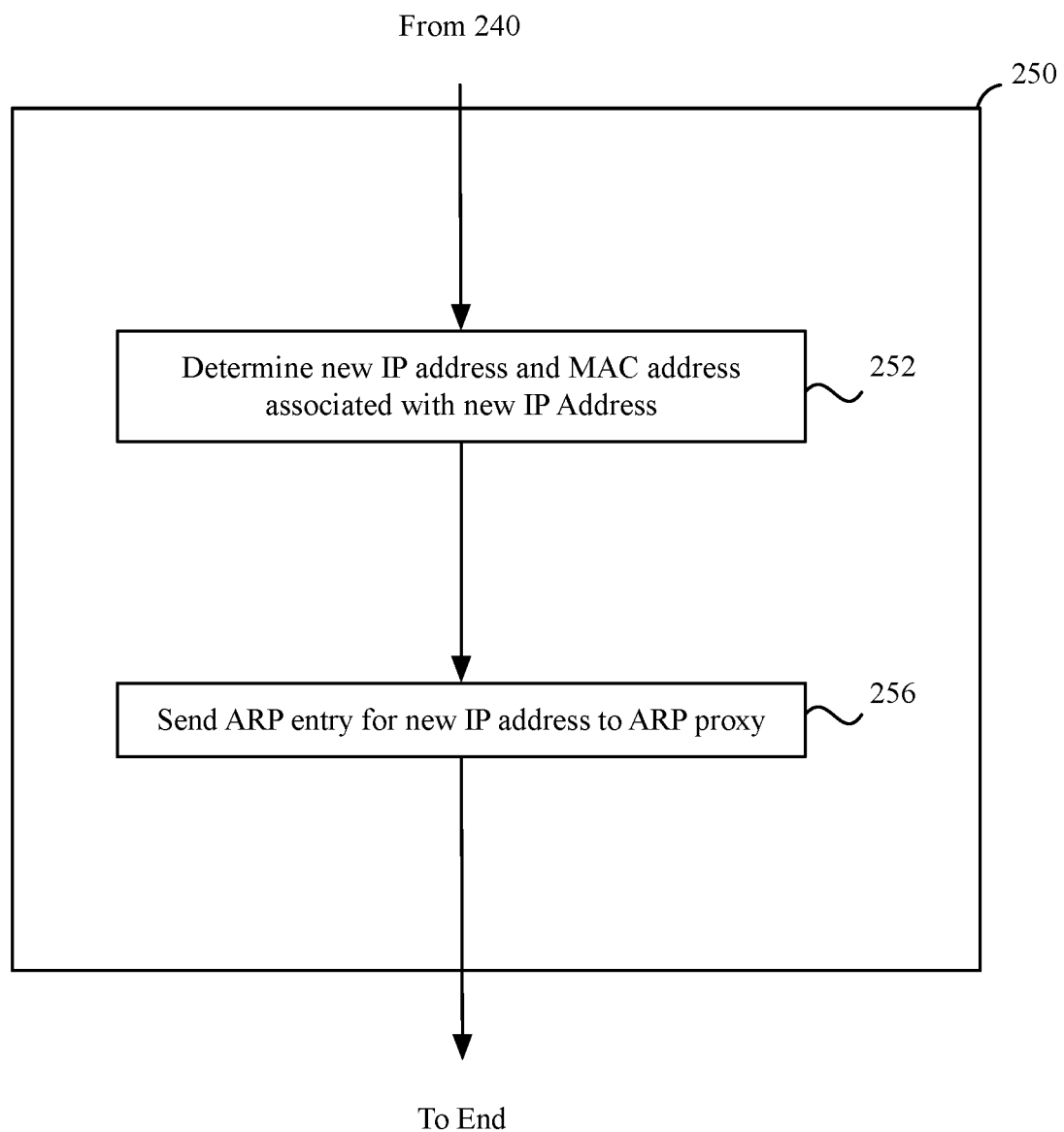
FIG. 4 conceptually illustrates in greater detail a step of configuring an ARP proxy, according to an embodiment.

FIG. 4 illustrates in greater detail an embodiment of the process of adding an ARP entry for the management VM as described in step 250 of FIG. 2 to configure an ARP proxy for provisioned or migrated VMs (e.g., management VMs, or other VMs not in the overlay network). In some embodiments, the ARP proxy is implemented as part of a virtual router. A virtual router in some embodiments includes an ARP table used to implement the ARP proxy.

As discussed in relation to FIG. 2, A new IP address is available on the host computer when, for example, a VM has been provisioned on the host computer or has been migrated to the host computer or when a new public IP address for a NAT operation is configured on a gateway VM of the host computer. In some embodiments, the determination is based on information received from the application or program responsible for provisioning or migrating the VM. In some embodiments, a vmkernel callout module provides notification of IP movement during a vMotion or failover operation. A virtual machine communication interface (VMCI) provides information about new NAT rules (e.g., the public IP address) relevant to a gateway VM (e.g., gateway VM 111) in some embodiments.

As part of step 250, the process continues at 252 by determining the new IP address and the MAC address associated with the new IP address. In some embodiments, the IP and MAC addresses are provided by the program or application responsible for provisioning or migrating the VM or performing the NAT operation. In some embodiments, an IP address is received and an ARP operation is performed by a virtual router to resolve the IP address.

The process continues at 256 by sending an ARP entry to the ARP proxy for the ARP proxy to use to resolve ARP requests. In some embodiments, the ARP entry is an ARP entry in an ARP table of a virtual router that is logically connected to a provisioned or migrated VM or the gateway VM that performs the NAT operation. In other embodiments, an ARP proxy is a separate module that executes in the hypervisor to which ARP requests are directed. The process then ends.

Once the ARP proxy is configured, for example, in a virtual router, ARP requests sent by one of the management VMs $110_{1-N}$ are directed to the ARP proxy for resolution. It should be understood that the ARP request is transmitted via a VNIC of the VM to a virtual port of virtual switch 113 in some embodiments. In embodiments in which the management VM is on a /32 subnet, the ARP request is directed to the virtual router as there are no other VMs on the subnet of the sending VM. In some embodiments in which management VMs are on /32 subnets, the virtual router serves as the ARP proxy for the management VMs. In such embodiments, the virtual router contains a separate ARP table for resolving IP addresses and ARP requests.

As an example of one embodiment described above, ARP table 116 in the virtual router processing pipeline resolves a destination IP address of the packet into a MAC address of the packet associated with the next hop towards the destination IP. In the case in which the destination IP belongs to a VM executing on the same host computer, the ARP table will have an entry for that destination IP and can resolve the MAC address using a MAC address programmed by the agent as part of, for example, process 400 or that it resolved by making an ARP request to local VMs. If the destination IP does not belong to a VM executing on the same host, the ARP proxy in some embodiments determines if it already contains an entry for the destination IP or if it must generate an ARP request to resolve the destination IP address.

Similarly, the virtual router that has been programmed by the agent processes received packets using routing entries for the VMs that have been provisioned or have migrated to the host computer on which the virtual router executes.

For packets received from a VM executing on the host computer, a virtual router in some embodiments determines whether the destination IP address of the packet is local or resident on another host computer. As described, agent 117 configures the routing table of a virtual router with routes for forwarding traffic destined for local VMs to those VMs. For traffic destined for VMs resident on other host computers, the virtual router is programmed to transmit the packet over L3 network 120 to an appropriate network interface of L3 network 120 based on the association of the destination IP addresses with a particular network interface. Further, for a packet routed over L3 network 120 to another network interface, the other network interface in some embodiments is connected to a logical interface of a virtual router which then routes the packet to the (local) VM based on its routing table.

Virtual router 114 changes the next hop MAC address of the packet based on whether the destination IP address of the packet is local. Virtual switch 113 then forwards the packet based on the MAC address to either the local VM connected to one of the virtual ports of virtual switch 113 or the default router if the VM is not local, as described above.

Figure 5:
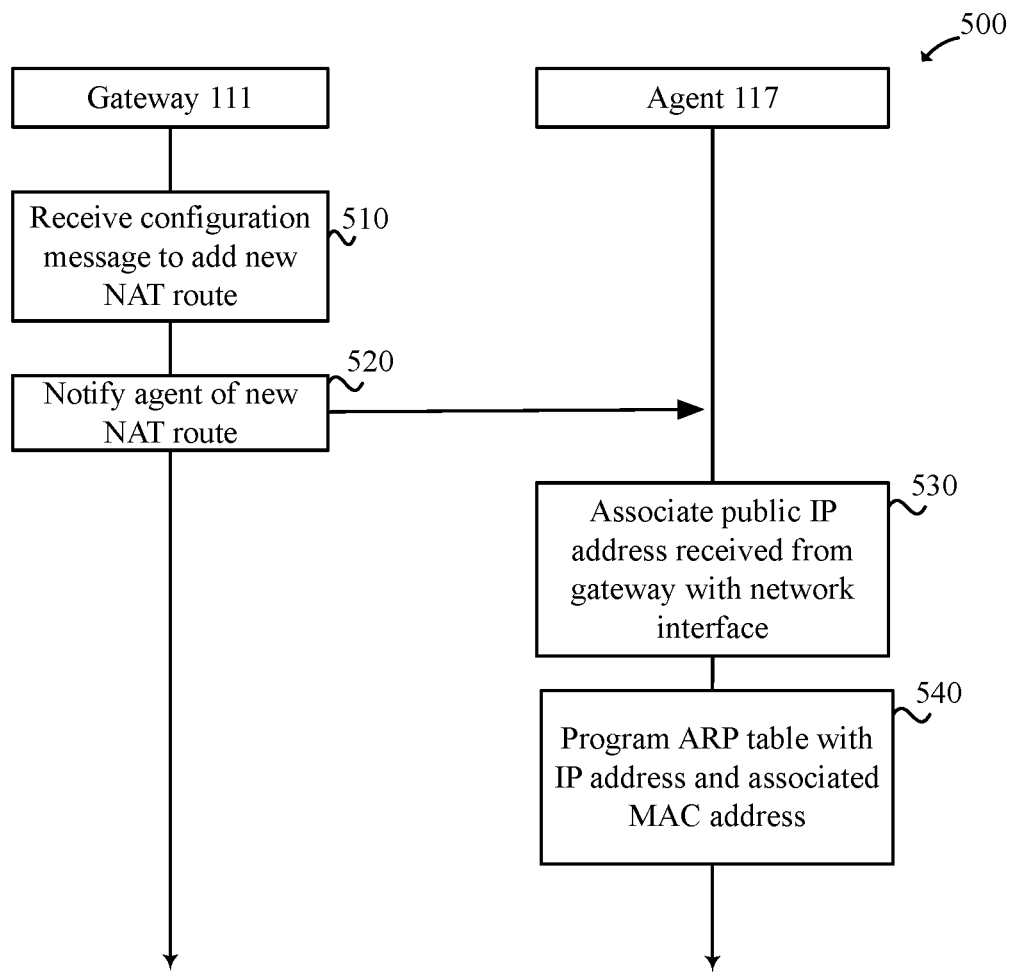
FIG. 5 conceptually illustrates a process of handling tracking and plumbing of addresses used in network address translation, according to an embodiment.

FIG. 5 illustrates a process 500 of handling tracking and plumbing of addresses used in network address translation, according to an embodiment. As described, NAT (and other services) in some embodiments is enabled on gateway VM 111. The binding of a VM's private IP address to a new public IP address needs to be handled in a similar manner as a new or migrated VM, by associating the public IP address with network interface 119 so that packets having the public IP address as their destination address can be routed to network interface 119 and ultimately to the VM. As shown, process 500 begins at step 510, where gateway VM 111 receives a configuration message to add a new NAT route. For example, a user enables NATing via a user interface provided by a management plane (e.g., the NSX manager described above), and in turn the management plane in some embodiments requests that gateway VM 111 add a new NAT route.

At step 520, gateway VM 111 notifies agent 117 of the new NAT route. In some embodiments, gateway VM 111 sends the NAT binding of the VM's private IP address to a public IP address to agent 117.

At step 530, agent 117 associates the public IP address received from gateway VM 111 with network interface 119. Doing so ensures that packets destined for the public IP address are steered by L3 network 120 to network interface 119, with the packets then being forwarded by virtual router 115 to gateway VM 111 that translates the public IP address back to the private IP address of the VM so that the packet can be forwarded to the VM.

At step 540, agent 117 further programs the IP address and its associated MAC address into an ARP proxy (e.g., virtual router having ARP table 116). Once programmed, the ARP proxy responds to an ARP request with the programmed MAC address without having to perform an ARP query. As described above, in some embodiments, the IP and MAC addresses are provided by the program or application responsible for provisioning or migrating the VM or performing the NAT operation. In some embodiments, an IP address is received and an ARP operation is performed by a virtual router to resolve the IP address.

Although described herein primarily with respect to VM migration, it should be understood that techniques disclosed herein are also applicable in the case of VM failover, which is similar to migration in that the VM in some embodiments is failed over to a different host.

Advantageously, techniques disclosed herein provide an L2 abstraction for an L3 network, without relying on an overlay network. Doing so solves the chicken-and-egg problem of VMs, such as those that manage an L2 overlay network, that require L2 notions of adjacency, L2 multicasting, or the like, but are not able to be placed on the overlay network they manage. As a result, techniques disclosed herein permit the same L2 semantics such as port groups, L2 adjacency, etc. to work with an L3 undelay.

Figure 6:
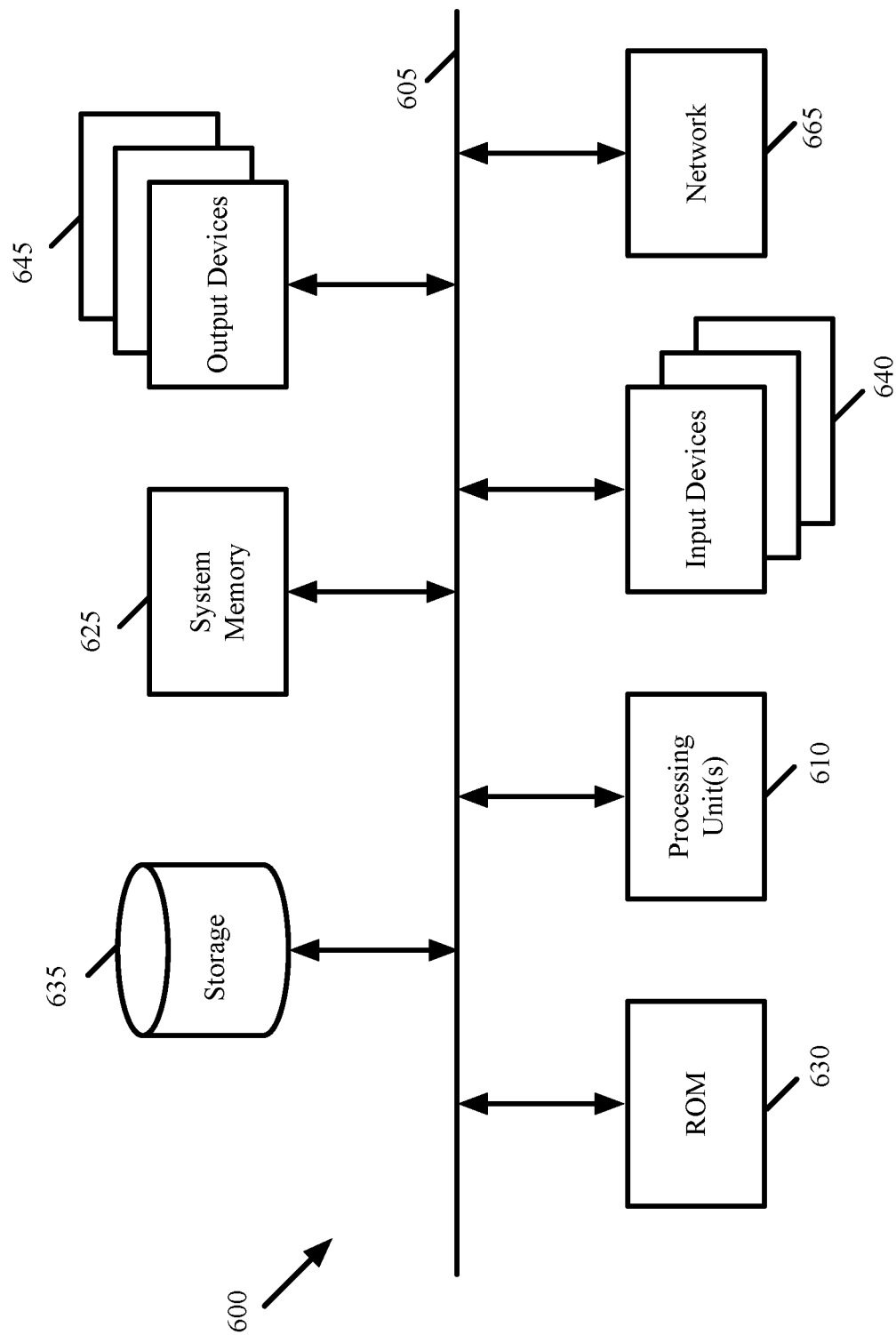
FIG. 6 conceptually illustrates an electronic system with which some embodiments of the invention are implemented.

FIG. 6 conceptually illustrates an electronic system 600 with which some embodiments of the invention are implemented. The electronic system 600 can be used to execute any of the control, virtualization, or operating system applications described above. The electronic system 600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the electronic system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments.

The read-only-memory (ROM) 630 stores static data and instructions that are needed by the processing unit(s) 610 and other modules of the electronic system. The permanent storage device 635, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory is a volatile read-and-write memory, such as random access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the electronic system. The input devices 640 include alphanumeric keyboards and pointing devices (also called "cursor control devices"). The output devices 645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples electronic system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of electronic system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host machine using resources of the host machine virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 2, 3, 4, and 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For an agent executing on a host computer to set up networking configuration for data compute nodes (DCNs) also executing on the host computer, a method comprising:
receiving information about a network address of a management DCN for execution on the host computer, the management DCN for managing a set of DCNs, wherein the set of DCNs are connected via an overlay network to which the management DCN does not connect, the network address being a network address that was not previously accessible on the host computer;
to enable the management DCN to send and receive management data traffic:
associating the network address of the management DCN with a network interface of an underlying network over which the overlay network is implemented such that network traffic for the network address of the management DCN is directed to the network interface;
adding a route for the network address to a routing table of a virtual router also executing on the host computer to provide routing for management data traffic to and from any management DCNs executing on the host computer; and
adding an address resolution entry for resolving the network address of the management DCN into a media access control (MAC) address associated with the management DCN to an address resolution table of an address resolution proxy executing on the host.

2. The method of claim 1, wherein:
the underlying network is a layer 3 (L3) network; and
associating the network address of the management DCN with the network interface comprises invoking one or more application programming interfaces (APIs).

3. The method of claim 1, wherein the network interface is associated with a plurality of network addresses.

4. The method of claim 1, wherein the virtual router forwards management data traffic from other management DCNs to at least one of a destination management DCN executing on the host computer and a default router based on routes in the routing table of the virtual router.

5. The method of claim 1, wherein the host computer is a first host computer, the network interface is a first network interface, the virtual router is a first virtual router, the address resolution proxy is a first address resolution proxy, and the management DCN is migrated from the first host computer to a second host computer, the method further comprising:
removing the route for the network address from the routing table of the first virtual router;
removing the address resolution entry for the network address from the address resolution table of the first address resolution proxy; and
removing the association between the network address of the management DCN and the first network interface such that network traffic directed to the network address is no longer directed to the first network interface,
wherein the network address of the management DCN is associated with a second network interface of the underlying network such that network traffic for the network address of the management DCN is directed to the second network interface,
a route for the network address is added to a routing table of a second virtual router that executes on the second host computer to provide routing for management data traffic to and from any management DCNs executing on the host computer, and
an address resolution entry for resolving the network address of the management DCN into a (MAC address associated with the management DCN is added to an address resolution table of an address resolution proxy executing on the second host computer.

6. The method of claim 1, wherein the management DCN executing on the host computer is configured to send management data traffic to the virtual router.

7. The method of claim 6, wherein the virtual router is configured as a default gateway of the management DCN.

8. The method of claim 1, wherein the network address of the management DCN is maintained as a property of at least one of the management DCN, a virtual network interface card (VNIC), and a virtual port to which the management DCN is connected.

9. The method of claim 1, wherein:
the virtual router is a first virtual router for a set of management DCNs and the address resolution proxy is a first address resolution proxy for the set of management DCNs;
the host computer also executes a second virtual router and a second address resolution proxy to provide routing and address resolution services for data traffic associated with a set of workload DCNs executing on the host computer; and
the agent does not add (1) the network address of the management DCN to a routing table of the second virtual router or (2) an address resolution entry for resolving the network address of the management DCN into the MAC address associated with the management DCN to the second address resolution proxy.

10. The method of claim 9, wherein:
the first virtual router connects to a virtual switch at a first port that is part of a management port group associated with the set of management DCNs; and
the second virtual router connects to the virtual switch at a second port that is part of a public port group that does not include ports connected to any management DCNs.

11. The method of claim 1, wherein receiving information about the network address of the management DCN comprises receiving information associated with a DCN migration event detected at the agent.

12. A non-transitory computer-readable medium storing a program for execution by one or more processing units of a host computer, the program for an agent executing on the host computer to set up networking configuration for data compute nodes (DCNs) also executing on the host computer, the program comprising sets of instructions for:
receiving information about a network address of a management DCN for execution on the host computer, the management DCN for managing a set of DCNs, wherein the set of DCNs are connected via an overlay network to which the management DCN does not connect, the network address being a network address that was not previously accessible on the host computer;
to enable the management DCN to send and receive management data traffic:
associating the network address of the management DCN with a network interface of an underlying network over which the overlay network is implemented such that network traffic for the network address of the management DCN is directed to the network interface;
adding a route for the network address to a routing table of a virtual router also executing on the host computer to provide routing for management data traffic to and from any management DCNs executing on the host computer; and
adding an address resolution entry for resolving the network address of the management DCN into a media access control (MAC) address associated with the management DCN to an address resolution table of an address resolution proxy executing on the host computer.

13. The non-transitory computer-readable medium of claim 12, wherein:
the underlying network is a layer 3 (L3) network; and
the set of instructions for associating the network address of the management DCN with the network interface comprises a set of instructions for invoking one or more application programming interfaces (APIs).

14. The non-transitory computer-readable medium of claim 12, wherein the network interface is associated with a plurality of network addresses.

15. The non-transitory computer-readable medium of claim 12, wherein the virtual router forwards management data traffic from other management DCNs to at least one of a destination management DCN executing on the host computer and a default router based on routes in the routing table of the virtual router.

16. The non-transitory computer-readable medium of claim 12, wherein the host computer is a first host computer, the network interface is a first network interface, the virtual router is a first virtual router, the address resolution proxy is a first address resolution proxy, and the management DCN is migrated from the first host computer to a second host computer, the program further comprising sets of instructions for:
removing the route for the network address from the routing table of the first virtual router;
removing the address resolution entry for the network address from the address resolution table of the first address resolution proxy; and
removing the association between the network address of the management DCN and the first network interface such that network traffic directed to the network address is no longer directed to the first network interface,
wherein the network address of the management DCN is associated with a second network interface of the underlying network such that network traffic for the network address of the management DCN is directed to the second network interface,
a route for the network address is added to a routing table of a second virtual router that executes on the second host computer to provide routing for management data traffic to and from any management DCNs executing on the host computer, and
an address resolution entry for resolving the network address of the management DCN into a (MAC address associated with the management DCN is added to an address resolution table of an address resolution proxy executing on the second host computer.

17. The non-transitory computer-readable medium of claim 12, wherein the management DCN executing on the host computer is configured to send management data traffic to the virtual router.

18. The non-transitory computer-readable medium of claim 17, wherein the virtual router is configured as a default gateway of the management DCN.

19. The non-transitory computer-readable medium of claim 12, wherein the network address of the management DCN is maintained as a property of at least one of the management DCN, a virtual network interface card (VNIC), and a virtual port to which the management DCN is connected.

20. The non-transitory computer-readable medium of claim 12, wherein the management DCN is configured to manage at least a part of the overlay network.

* * * * *